United States Patent [19]

Jackson et al.

[11] 3,796,957

[45] Mar. 12, 1974

[54] AUTOMATIC IDENTIFICATION AND SYNCHRONIZATION CIRCUIT

[75] Inventors: Edward J. Jackson; Robert F. Linfield, both of Boulder, Colo.

[73] Assignee: Westinghouse Electric Corporation, Pittsburgh, Pa.

[22] Filed: May 4, 1972

[21] Appl. No.: 250,214

[52] U.S. Cl. ............................... 325/58, 343/102 R

[51] Int. Cl. ............................................ H04h 3/00

[58] Field of Search....... 343/102 R, 105 R; 325/58, 325/63, 478, 480, 322, 323, 324; 328/55, 63, 72, 74, 75, 155; 178/69.5 R; 179/15 BS

[56] References Cited

UNITED STATES PATENTS

| | | | |
|---|---|---|---|
| 3,155,773 | 11/1964 | Robin et al. | 178/69.5 R |
| 3,436,480 | 4/1969 | Pan | 178/69.5 R |
| 3,462,551 | 8/1969 | Fong | 178/69.5 R |
| 3,628,058 | 12/1971 | Espe | 325/478 X |
| 3,660,765 | 5/1972 | Glasser et al. | 325/478 X |

*Primary Examiner*—Benedict V. Safourek
*Attorney, Agent, or Firm*—C. L. O'Rourke

[57] ABSTRACT

In a receiver an automatic signal identification and synchronization circuit is utilized to identify the transmitting station and to synchronize internally generated commutating gates with the received signal. The received RF signal format is compared with a selected series of commutating gates by utilizing an up/down counter and a series of synchronizing control gates to either advance or retard the series of internally generated gate pulses. By solely retarding or advancing the commutating gates synchronization with the incoming RF signal format is achieved. A filter and envelope detector is utilized in the identification and synchronization circuit which passes no signal in a high noise environment thereby eliminating false synchronization.

9 Claims, 8 Drawing Figures

AUTOMATIC IDENTIFICATION AND SYNCHRONIZATION CIRCUIT

BACKGROUND OF THE INVENTION

1. Field of the Invention

This invention relates to a communication system and more particularly to the identification of a given transmitting station and subsequent synchronization with the signal format of that transmitting station. This invention is further related to detecting and synchronizing with a transmitted signal only when the signal to noise ratio exceeds some set threshold value.

2. Description of the Prior Art

In a communication system in which there is more than one transmitting station there is a requirement for the receiver of that system to be able to identify the transmitting station and to synchronize with the signal format of that station. A specific example of such a communication system is the Omega navigation system in which eight transmitting stations are set up worldwide to provide an all-weather electronic navigational system. An Omega receiver receiving signals from various pairs of Omega transmitting stations measures the phase difference between these signals and thereby establishes position on a spherically modified hyperbolic grid.

Each Omega station transmits an accurately timed synchronized carrier signal in the VLF range. Each station transmits a given signal format during a ten second period which is continuously repeated. Three basic frequencies are utilized for navigational purposes: 10.2, 11.33, and 13.6 kHz. The timing sequence and differences in pulse length permit the station to be identified. In FIG. 1 the signal format is shown for the eight stations contemplated in the Omega system. As is shown in FIG. 1 each station also broadcasts two unique frequencies within the ten second period when it is not transmitting the basic navigational pulses.

Various methods have been used for identifying and synchronizing with a given station signal. First the receiver can utilize circuitry which will correlate internally generated gating pulses with the incoming signal envelope so as to provide pulse width correlation. Since the signaling periods at any given frequency are different for each station as is clearly shown in FIG. 1, a given station can be identified in this manner. Also maximum correlation is achieved when the internally generated gates are synchronized with the incoming signal format. This method requires elaborate circuitry and is utilized in only the most sophisticated receivers.

A second method is to compare the beginning of a given signal format with the absolute time. Each station begins a 10 second transmission period at a different absolute time. Thus the 10.2 kHz signal emitted from station A begins at 00:00:00 UTC time and repeats every ten seconds thereafter; other stations follow this sequence but each delay by one pulse interval. It is therefore possible to identify and synchronize on any station by using an independent standard time reference. A very high stability however is required of the independent standard time reference.

A given transmitting station can also be identified by the relative amplitude of signal received. This method involves a priori knowledge of the expected signal levels in a given operating area. A station can be identified on the basis that its amplitude exceeds that of othe received signals. Synchronization is achieved by advancing or retarding sync gate pulses to match this maximum signal period. Such a method is usually done manually by using a meter, lights or an oscilloscope. Its obvious limitation is the requirement for initial knowledge of the general location of the receiver.

Finally it is possible by using the side frequencies which are unique to each station to identify each station signal. Selective filters may be used to receive these side frequencies for station identification. Synchronization can then be achieved by matching internal sync pulses to the side frequency envelope. This method can be relatively easily implemented and can operate automatically. Thus an unattended receiver which might be on a remote moving platform such as a buoy or balloon can acquire and maintain synchronization with a desired station signal.

Although this invention is discussed in terms of the Omega navigational system for which it has particular application it will be understood that this type of circuit may be used in any communication system where the transmitting frequency is known and the envelope of the signal format is likewise known.

SUMMARY OF THE INVENTION

In accordance with the invention, there is an identification and synchronizing circuit for a receiver for synchronizing a series of internally generated commutating gates with an RF signal format having some signal segment thereof at a given frequency $F_1$. The input RF signal is processed through filter means whose center frequency is tuned to the frequency $F_1$ and an adaptive envelope detector which emits pulses having a duration in correspondence with the envelope of the signal. The commutating gates are internally generated and have pulse widths and pulse spacings substantially corresponding to the envelope of the RF signal format. The commutating pulses are compared with the envelope of the RF signal format in a manner to produce advance or retard output signals to a series of sync gates. Synchronizing control means, including the sync gates, advance or retard the series of commutating gates to adjust the sequence of the gates in correspondence with the RF signal format. The commutating gates which are compared with the RF signal format are selectively chosen so as to correspond with the unique format of a given station; thereby the station can be selectively chosen.

The envelope detector is so configured as to provide an adaptive threshold. In this manner when the noise environment reaches a certain level, i.e. the signal to noise ratio decreases to some threshold amount, no output signal is provided by the detector. The detector comprises low pass filters connected in cascade with the output of each filter applied to comparing means. The first filter follows the envelope of the detected RF signal and the second filter gives a signal corresponding to the average noise level.

DESCRIPTION OF THE PREFERRED EMBODIMENTS

Figure 1:
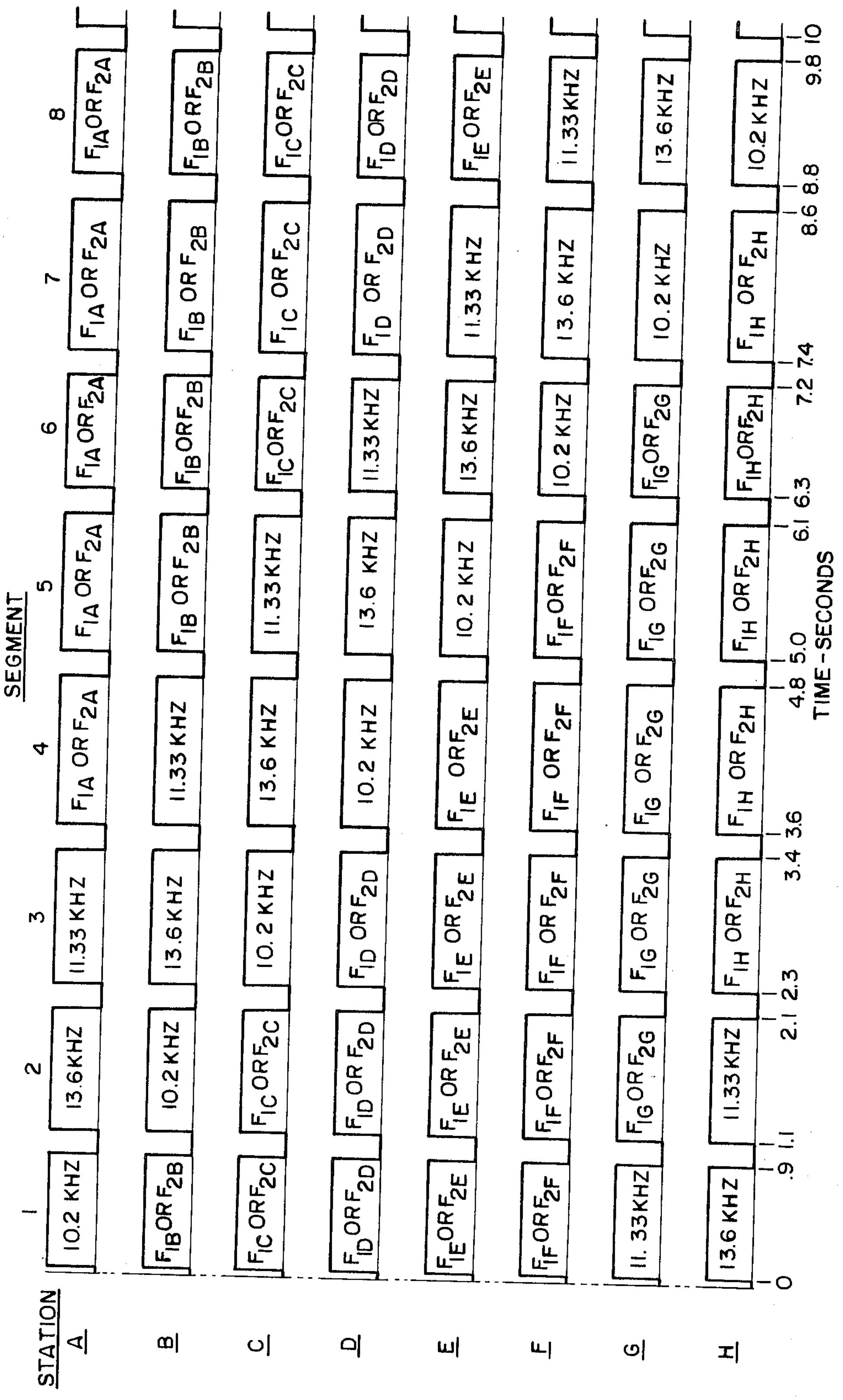
FIG. 1 is a representation of the transmission format for the Omega navigational system.

Since this invention finds specific utilization in the Omega navigation system it will be described in the context of and using parameters of that system. Thusly FIG. 1 shows the transmission signal format for the eight Omega stations A through H. The format repeats every 10 seconds and can be broken down into eight segments as indicated in FIG. 1. It will be noted that each station broadcasts two side signals at frequencies unique to that station. Additionally it will be noted that spacing between pulses is 0.2 seconds and that the pulse widths vary from 0.8 seconds to 1.2 seconds.

Figure 2:
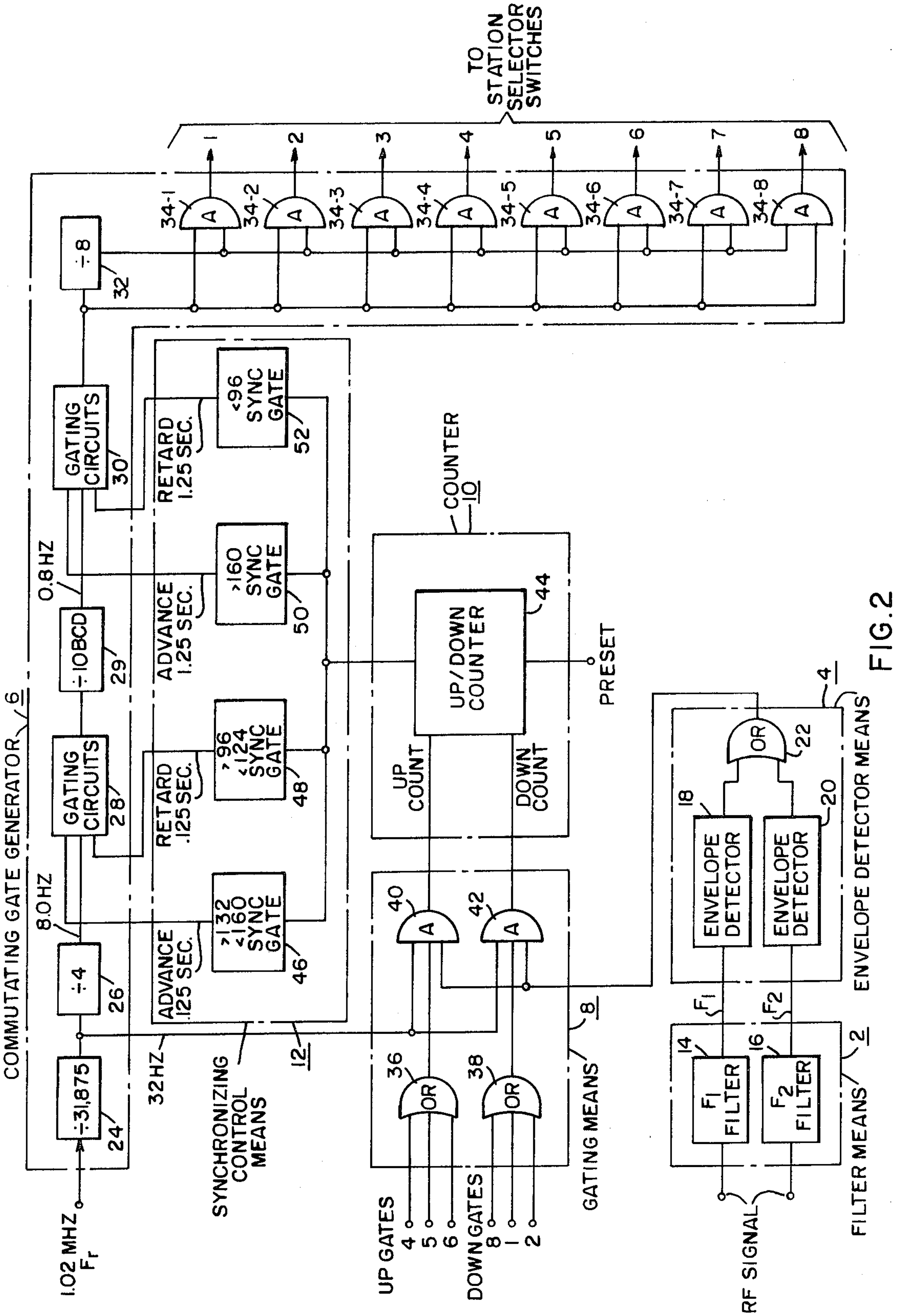
FIG. 2 is a schematic diagram of the identification and synchronization circuit of the invention.

In FIG. 2 a schematic diagram is shown having an Omega commutating gate generator and automatic synchronization circuitry. The total circuit is comprised of filter means 2, envelope detector 4, commutating gate generator 6, gating means 8, counter 10, and synchronizing control means 12. Filter means 2 can include one or more narrow band RF filters 14, 16 which are each tuned to the center frequency of one of the unique side frequencies included in the transmission format. The envelope detector means 4 is comprised of as many envelope detectors 18 and 20 as there are filters in filter means 2. Each envelope detector 18 and 20 follows closely the envelope of the RF signal segment passed by the respective filter 14 and 16. The output of each envelope detector 18 and 20 is applied to OR gate 22 so as to provide a final output of the envelope detector means 4 which follows the envelope of all side frequency signal segments detected. The operation of the envelope detector means 4 is described in greater detail below.

The commutating gate generator 6 provides a series of internally generated commutating gates whose pulse width and pulse spacing corresponds substantially to the signaling intervals of an Omega transmitting station.

Gating means 8 provides for the selection of two sets of commutating gates which can be correlated with the adaptive envelope detector output and thereby gate a series of count up pulses and a series of count down pulses to the counter 10. Counter 10 in turn provides a bi-directional count which, depending upon the resultant count at the end of a transmission interval, either advances or retards the pulses to the commutating gate generator 6. The command to advance or retard the series of commutating pulses is made through synchronizing control means 12.

Figure 3:
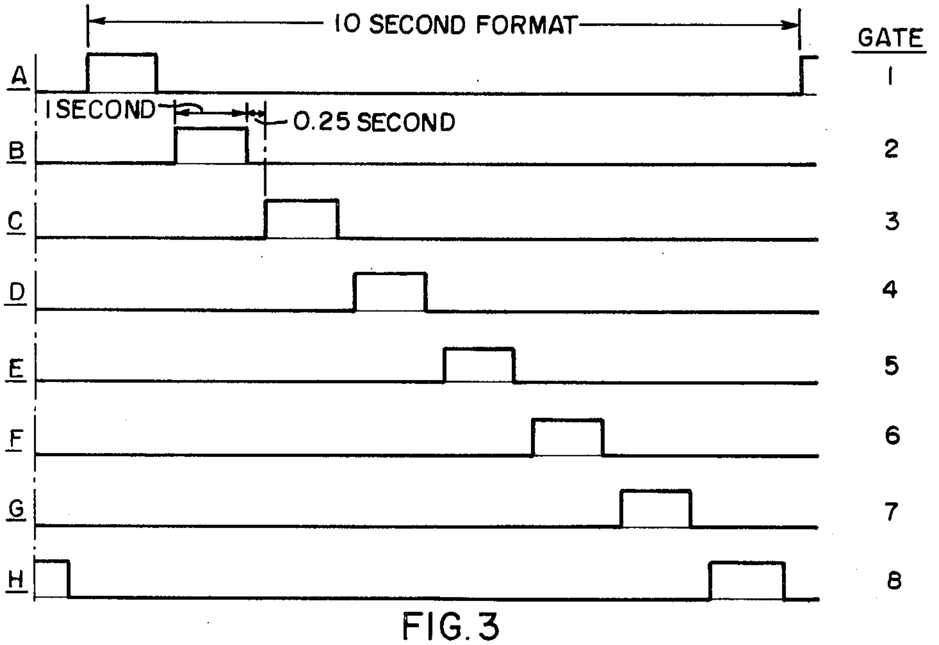
FIG. 3 is a timing diagram showing the sequence of the internally generated gate pulses.

Looking in greater detail at the operation of the gate generator and automatic synchronization circuit as shown in FIG. 2, the output of the gate generator 6 is a series of eight time sequenced 1.0 second gates with a spacing of 0.25 seconds between successive gates. This time relationshp is shown in FIG. 3 for the eight gates. It is to be appreciated that such a series of gating pulses can be varied to fit the format of the particular RF signal to be received and synchronized in the receiver. In the case of the Omega navigational system the gate pattern as shown in FIG. 3 is simple to generate and sufficiently approximates the actual transmission format as shown in FIG. 1 that there is no appreciable degradation of performance.

A reference frequency input $F_r$ which in the Omega application as shown in FIG. 2 is chosen to be 1.02 mHz is applied to frequency divider 24. Since it is desired to produce a gate pattern of eight pulses every 10 seconds the reference frequency can be any frequency which is a multiple of 8. The output of divider 24 is applied to gating means 8 to establish a 32 Hz counting rate and to frequency divider 26 to obtain an output of 8.0 Hz. This signal is applied to gating circuit means 28 which controls the advance or retard commands from synchronizing control means 12. The 8.0 Hz signal is then divided by ten using BCD divider 30 to obtain an 0.8 Hz signal that is at a logic "zero" for 1.0 seconds and at a logic "one" for 0.25 seconds of each cycle. This signal is applied to second gating circuit means 30 which also introduces advance or retard commands from synchronizing control means 12. The 0.8 Hz signal is then used to drive divider 32 which is a divide by 8 circuit. In effect divider 32 then sequences the outputs of gates 34–1 to 34–8 to provide the eight individual one second gates with 0.25 second spacings between successive gates as shown in FIG. 3.

Figure 4:
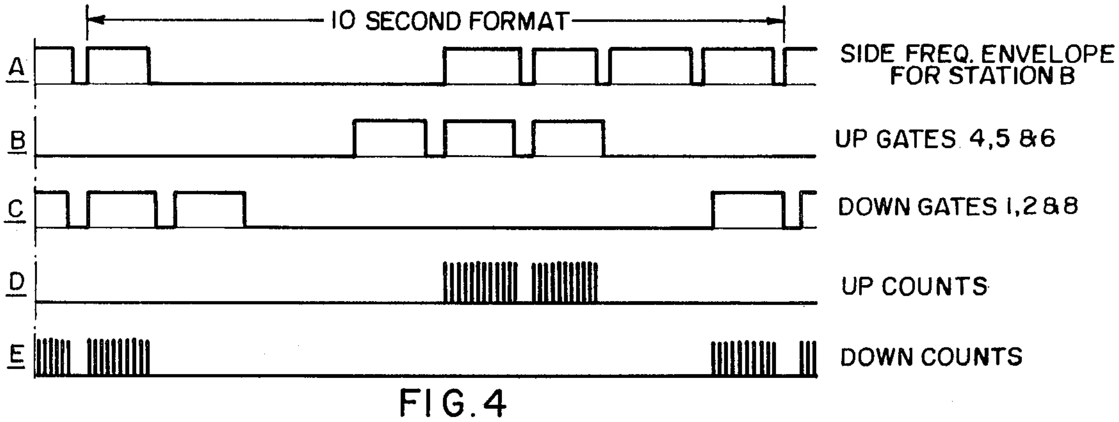
FIG. 4 is a timing diagram showing the waveform alignment for proper synchronization using station B side frequencies.

To illustrate the synchronization procedure the timing format of station B as shown in FIG. 1 will be used as an example. FIG. 4 shows the correspondence between the side frequency envelope for station B and the up and down gates generated by the gate generator 6 shown in FIG. 2. In FIG. 4 these pulses correspond exactly, thereby showing proper waveform alignment and no requirement to either advance or retard the gate pulses. Specifically in Curve 4A the side frequency envelopes of station B are shown. Curve 4B shows a series of up count gates obtained by a logical OR of gates 4, 5, and 6. In Curve 4C a series of down count gates are shown which are obtained by a logical OR of gates 8, 1, and 2. The commutating gates are selected dependent upon which station signal it is deisred to synchronize with. Curves 4D and 4E show respectively the up and down counts which represent the output of gating means 8 of FIG. 2. In this particular example the up and down counts balance out thereby giving no net up or down count over the 10 second period.

The above synchronization procedure is accomplished by gating means 8 as shown in FIG. 2. Gating means 8 includes OR gates 36 and 38 whose output is applied to AND gate 40 and 42 respectively. The output from the envelope detector means 4 is also applied to the AND gates 40 and 42. When both the envelope of the RF signal and the up gates are present at the input to AND gate 40 there is a resultant up count at a rate of 32 Hz. When both the output of the envelope detector means 4 and the down gates from OR gate 38 are present at the input to AND gate 42, a down count output is provided at 32 Hz count rate. Thus the up count gates and down count gates are applied to logical AND gates 40 and 42 along with the side frequency envelopes derived from envelope detector means 4 to control the count inputs to the up/down counter 44. When synchronization is achieved as shown in FIG. 4, the number of up counts and number of down counts will be approximately equal for a resultant zero count.

Figure 5:
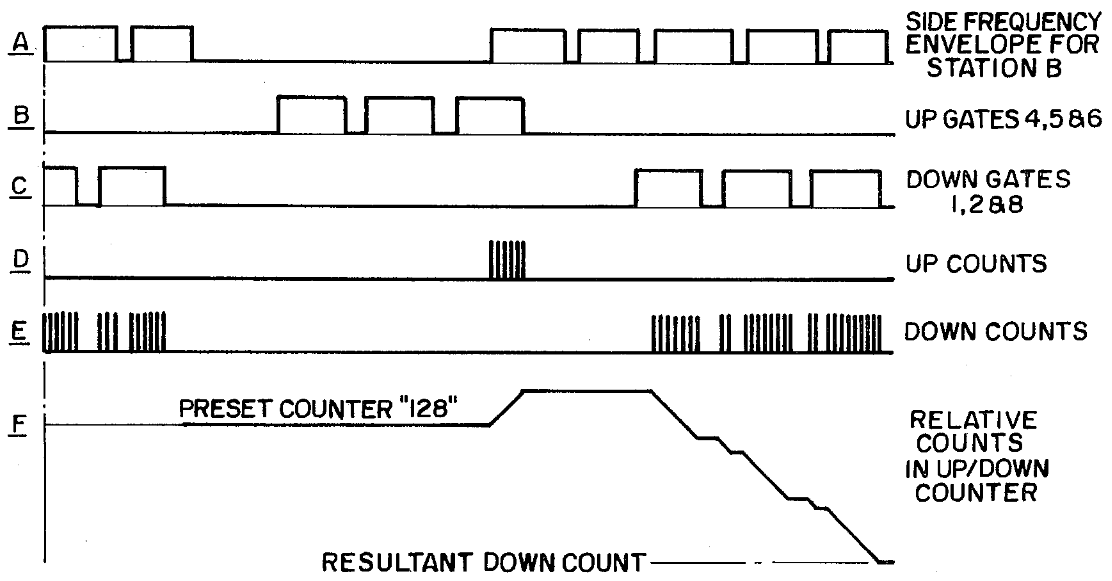
FIG. 5 shows the counting sequence for a resultant down count and a retard command.

FIG. 5 shows the counting sequence for generating a resultant down count. Thus Curve A shows the side frequency envelope of station B. Curve B shows the up gates 4, 5, and 6 and Curve C shows the down gates 8, 1, and 2. Curves 5D and 5E show respectively the up counts and down counts during a 10 second period. The up/down counter 44 being preset to a count of "128" as shown in Curve 5F then shows a resultant down count which generates a retard command. Such a retard cycle repeats until synchronization is achieved. As shown in FIG. 2 the retard command emitted from the up/down counter 44 is applied to the synchronizing control means 12.

In FIG. 2 if the timing gates as applied to the OR gates 36 and 38 are late, the up/down counter 44 will have a resultant positive count for each ten second interval. The output command from the up/down counter 44 processed by the synchronizing control means 12 and gating circuits 28 or 30 will produce an advance command to advance the gate timing. The advance cycle repeats until synchronization is achieved.

Figure 8:
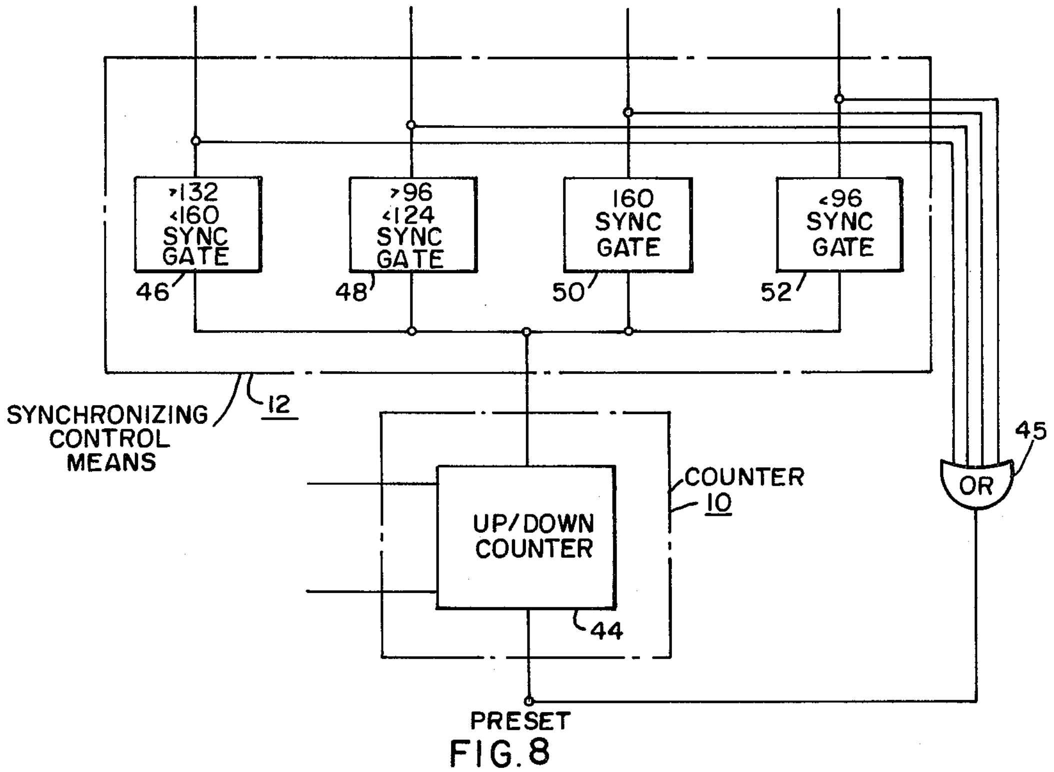
FIG. 8 is a schematic diagram showing a part of the circuit of FIG. 2 wherein automatic preset control is included.

As shown in FIG. 8 one way of resetting the counter to a count of "128" after each cycle is to apply the outputs of sync gates 46, 48, 50, and 52 to the preset terminal of counter 44 through OR gate 45. After an advance or retard command, the counter is thereby preset at a count of "128" for the next count cycle.

Once synchronization has been achieved as illustrated for Station B above, other desired stations and frequencies can be tracked by selecting the appropriate timing gates. In FIG. 2 a particular station can be selected by station selector switches at the output of commutating gate generator 6 and thence patching selected up gates to OR gate 36 and selected down gates to OR gate 38. Since each transmitting station's signal format corresponds to a different combination of commutating gates, any one station can be identified by the commutating gates applied to the inputs of gating means 8.

The parameters of the synchronizing control means 12 are established to provide the desired timing error resolution. It is to be appreciated that the given parameters are established in the context of the Omega transmission format (FIG. 1). The maximum allowable timing error was therefore set at 0.1 seconds or ½ the time interval between successive transmissions in the Omega transmission format. Four logic channels within the synchronizing control means 12 allow coarse advance and retard commands of 1.25 seconds and fine advance and retard commands of 0.125 seconds to be made. By making fine corrections of 0.125 seconds a timing error of less than 0.0625 seconds can be maintained. The coarse timing corrections of 1.25 seconds allow the synchronization process to be speeded up in those cases where there is a large initial timing error. Dependent upon the resultant count from counter 44 one of the sync gates 46, 48, 50, or 52 is enabled unless synchronization has already been achieved. Thus a resultant count greater than 132 and less than 160 counts enables sync gate 46. A resultant count greater than 96 and less than 124 counts enables gate 48. A resultant count greater than 160 counts enables sync gate 50. A resultant count less than 96 counts enables sync gate 52. The logic circuitry necessary for the sync gates 46, 48, 50 and 52 is well known to one skilled in the art and consequently is not shown in detail.

When sync gate 46 is enabled by a resultant count from counter 44 lying in the count range of 132 to 160 counts a pulse is applied to gating circuit means 28 to advance the 8.0 Hz signal by one pulse. When sync gate 48 is enabled by a resultant count from counter 44 lying in the range of 96 to 124 counts a retarding pulse is applied to gating circuit means 28 to retard the 8.0 Hz signal by one pulse.

The coarse adjustments of 1.25 seconds are correspondingly achieved by means of sync gates 50 and 52. When the respective sync gates 50 or 52 are enabled an advance or retard pulse is applied to gating means 30 thereby advancing or retarding the 0.8 Hz signal by one pulse. The logic circuitry of gating circuit means 28 and 30 is obvious to one skilled in the art and consequently the details are not shown herein.

The 32 Hz count frequency applied to the up/down counter 44 is chosen to allow sufficient resolution of the timing error. With this count frequency a timing error of 0.0625 seconds produces a resultant up/down count of 4. Since the up/down counter must be capable of counting for three seconds in either direction it must have a range of greater than 96 counts. An eight stage counter preset to a count of "128" provides the required count range. The resultant count in the up/-down counter is provided after a complete up/down cycle; i.e., after the third down count gate which in the case shown in FIG. 2 is gate 2. If the resultant count is within plus or minus 3 counts of the preset 128, no change is made because synchronization is within the desired range. When the resultant count lies in a range of 125 counts to 131 counts none of the sync gates 46, 48, 50, or 52 are enabled. If the resultant count is greater than plus or minus 3 counts of the present 128, the action as described above takes place to either advance or retard the signal until synchronization is obtained.

Figure 6:
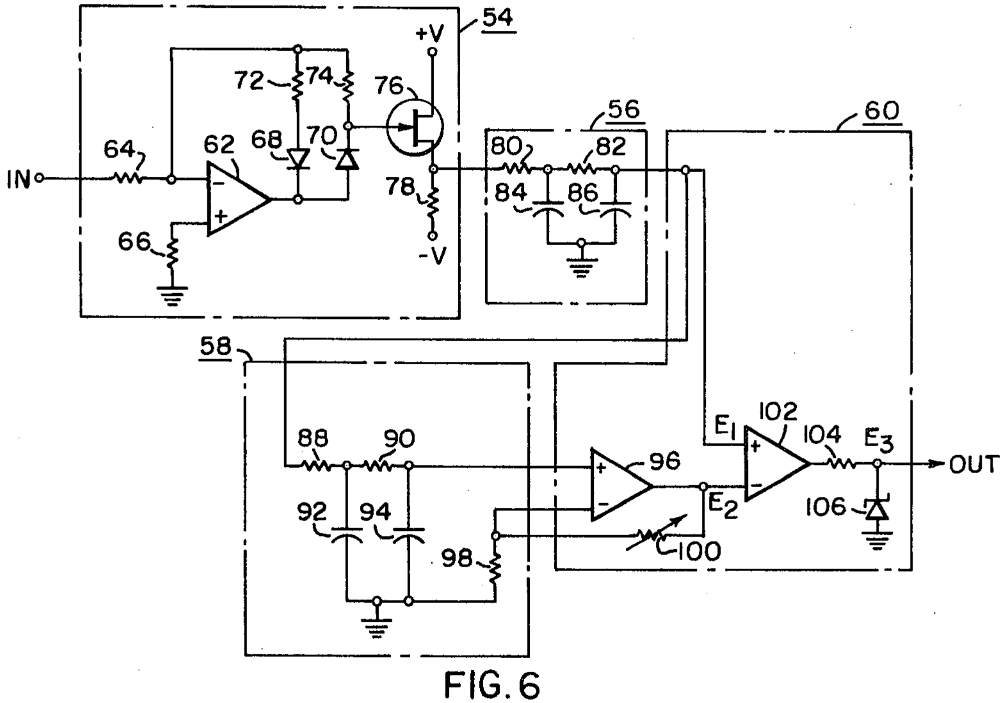
FIG. 6 is a schematic diagram of an envelope detector with adaptive threshold used in the identification and synchronization circuit of the invention.

Of particular significance to this invention is an adaptive threshold envelope detector which is shown in FIG. 6. The envelope detector shown in FIG. 6 essentially consists of rectifier means 54, a first low pass filter 56, a second low pass filter 58 connected in cascade with the first low pass filter 56, and comparator means 60.

One of the major problems encountered in a synchronization circuit of this type is the detection of the signal envelope when there is a low signal to noise ratio. In the Omega navigational system application the low signal to noise ratio may be caused by the particular areas of the world in which the receiver is used or to certain seasons and time of day which cause increased atmospheric noise levels. This means that the predetection filter band width must be made as small as possible without degradation of the signal format. For example, a filter bandwidth of 10 Hz would be appropriate in this application.

The envelope detector of FIG. 6 is designed to provide an output which corresponds to the "side frequency" signal envelopes emitted from a selected Omega transmitting station. Since the two side frequencies may be alternately keyed for data transmission, it is necessary to use two side frequency filters (filters 14 and 16 in FIG. 2). Two envelope detectors 18 and 20 are then required whose outputs are applied to an OR gate 22 in order to obtain the desired side frequency intervals.

The circuit of FIG. 6 is adaptive so that upon loss of signal or when the average noise level exceeds the signal the output is essentially zero. Large noise spikes may result in spurious outputs but these will occur randomly with time and therefore will average to zero when the gating counts are applied to an up/down counter. This adaptive feature prevents a loss of synchronization during adverse noise conditions or upon loss of signals.

To obtain a noise free envelope detector output a threshold must be established such that the envelope of the noise alone is always below the threshold and the envelope of the signal plus noise is always above it. Since the signal and noise levels can vary considerably it is difficult to establish an optimum threshold. To overcome this problem an adaptive threshold envelope detector as shown in FIG. 6 is disclosed that automatically establishes a threshold at a certain margin above the average noise level regardless of what this level may be. A description of the operation of the envelope detector follows. The rectifier means includes an operational amplifier 62 having a first and second input. The filter input signal is applied to the first input of the amplifier 62 through resistor 64. The second input to amplifier 62 is biased to ground through resistor 66. The output of amplifier 62 is connected to the cathode of a first diode 68 and to the anode of a second diode 70. The diodes 68 and 70 are connected in feedback relationship to amplifier 62 through resistors 72 and 74 respectively to the first input of amplifier 62. The gate of FET transistor 76, connected as a source follower, is connected to the junction between resistor 74 and diode 70. The FET 76 has a drain at some positive potential and a source biased negatively through resistor 78. The source follower provides isolation for the following low pass filter 56. The operational amplifier 62 with its associated diodes 68 and 70 act as a halfwave rectifier with nearly ideal characteristics and closely follows the envelope of the side frequency signal and noise. The output of the rectifier means 54 is applied directly to the low pass filter 56.

The first low pass filter 56 includes resistor 80 one end of which is connected to the source output of the FET 76 and the other end of which is connected in series with resistor 82. One side of capacitor 84 is connected to the junction of resistors 80 and 82 and the other side of capacitor 84 is connected to gound. The second end of resistor 82 is connected to ground through capacitor 86. The junction of capacitor 86 and resistor 82 provide an output which is applied to the second low pass filter 58 and to the comparator means 60.

The second low pass filter includes the resistor 88 the first end of which is connected to the first low pass filter output. The resistor 88 is connected in series with resistor 90. Capacitor 92 provides a path to ground from the junction of resistors 88 and 90. Capacitor 94 is connected between the second end of resistor 90 and ground. The junction between resistor 90 and capacitor 94 is connected to the comparator means 60.

The comparator means 60 includes a variable gain amplifier 96 having a first input connected to the output of the second low pass filter and having a second input going to ground through resistor 98. The gain of amplifier 96 is varied by means of variable resistance 100 which is connected between the output of amplifier 96 and the second input of amplifier 96 in a feedback relationship. The output of the first low pass filter 56 is applied to a first input of the operational amplifier comparator 102 and the output of variable gain amplifier 96 is applied to a second input of amplifier 102. The output of amplifier 102 is connected to the cathode side of Zener diode 106 through resistor 104. The anode electrode of Zener diode 106 is connected to ground.

Figure 7:
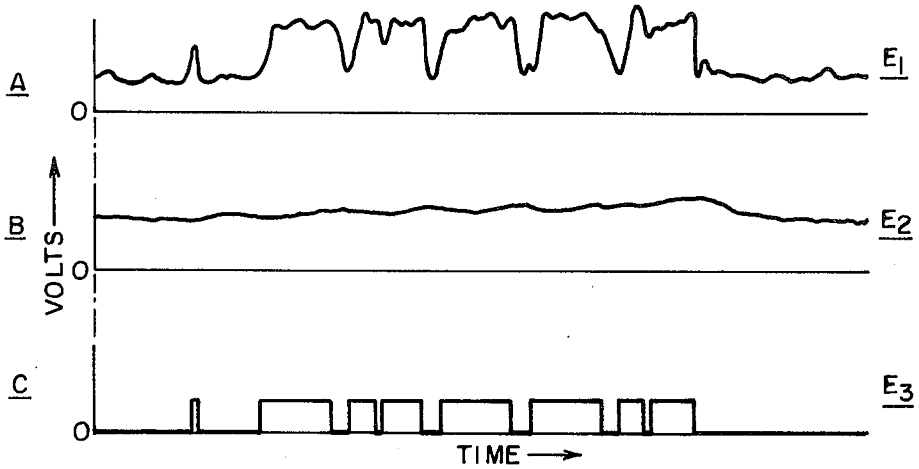
FIG. 7 shows typical waveforms as observed at the inputs and the output of the comparator shown in FIG. 6.

The time constant of the first low pass filter 56 is chosen to follow the envelope of the side frequency signal and noise. The output of the first low pass filter 56 which is applied to the first terminal of the operational amplifier comparator 102 is shown in Curve A of FIG. 7. The parameters of the second low pass filter 58 are chosen to obtain a greater time constant, at least an order of magnitude greater than the time constant of the first low pass filter, and thereby produce an output that is nearly proportional to the average noise level. This average noise level signal is applied to the variable gain amplifier 96 and sets a threshold at the second input of operational amplifier comparator 102 which is shown in Curve B of FIG. 7. The desired threshold setting is obtained by adjusting the gain of variable gain amplifier 96 through resistor 100.

The Zener diode circuit including Zener diode 106 and resistor 104 at the output of the comparator 102 is required to obtain logic level output. When the envelope input to the first input of the comparator 102 exceeds the threshold signal applied to the second input of comparator 102, the output goes to a logic "one" level and when the envelope is less than the threshold the output of comparator 102 is a logic "zero". This is shown in Curve C of FIG. 7.

Under conditions of poor signal to noise ratios or the absence of a signal, the output of the comparator 102 will, except for large noise pulses, remain in the zero state and thus will not effect the synchronizing circuits. The synchronization will remain as it was until a sufficient signal to noise ratio is obtained.

It will be appreciated that the invention disclosed herein may be applied widely in communication systems other that that of the Omega navigation system. Whenever a cyclic signal format having segments the duration of which are known along with certain side frequencies of that signal, this identification and synchronization circuit can be utilized. Moreover, the envelope detector which is an essential aspect of the circuit has utilization whenever an adaptive threshold is essential for operation of a given communication system in a variable noise environment.

While there has been shown and described what is at present considered to be the preferred embodiment of the invention, modifications thereto will readily occur to those skilled in the art. It is not desired therefore that the invention be limited to the specific arrangement shown and described, but it is to be understood that all equivalence, alterations, and modifications within the spirit and scope of the present invention are meant to be included.

What is claimed is:

1. A circuit for synchronizing a series of commutating gates with an RF signal format having a signal segment thereof at some frequency $F_1$ and having noise superimposed thereon, comprising:

filter means tuned to said frequency $F_1$;

envelope detector means operably responsive to said filter means for emitting pulses whose duration corresponds to the envelope of said signal segment;

means for generating said series of said commutating gates having pulse widths and pulse spacings substantially corresponding to the envelope of said RF signal format, up gating means responsive to selected ones of said commutating gates and said pulses emitted by said envelope detector for producing an up count signal;

down gating means responsive to other selected ones of said commutating gates and said pulses emitted by said envelope detector for producing a down count signal;

counting means responsive to said output signals of said up and down gating means for producing a resultant count output; and synchronizing control means responsive to said resultant count output to advance and retard said series of said commutating gates for adjusting to sequence correspondence with said RF signal format.

2. The circuit as defined in claim 1 wherein said synchronizing control means is incrementally responsive to said resultant count output to adjust said commutating gates in increments proportional to said resultant count output.

3. The circuit as defined in claim 2 wherein said synchronizing control means includes a plurality of sync gate means each responsive to a different range of values of said resultant count output of said counting means for producing output pulse signals.

4. The circuit as defined in claim 1 wherein said envelope detector means includes comparator means responsive to said RF signal format only when said noise is less than some preset threshold value.

5. The circuit as defined in claim 4 wherein said comparator means includes a variable gain amplifier for varying said threshold value.

6. An RF envelope detector having an adaptive voltage threshold level comprising:

rectifier means responsive to an RF signal including some noise superimposed thereon to provide an output signal which follows the envelope of sid RF signal;

first low pass filter means responsive to said output signal of said rectifier means and having a time constant such that the output signal of said first filter means follows the output signal of said rectifier means;

second low pass filter means responsive to said output of said first filter means and having a time constant such that the output signal of said second filter means is proportional to the average noise level superimposed on said RF signal; and comparator means responsive to said first and second filter means for comparing said outputs of said first and second filter means adapted to provide a first detector output when said output of said first filter means exceeds said output of said second filter means and to provide a second detector output when said output of said second filter means exceeds said output of said first filter means.

7. The RF envelop detector of claim 6 wherein said second low pass filter means has a time constant at least one order of magnitude greater than the time constant of said first low pass filter.

8. The RF envelope detector of claim 6 wherein said comparator means includes a variable gain amplifier responsive to said second filter means for providing a threshold output proportional to the average noise level of said RF signal.

9. The RF envelope detector of claim 8 wherein said comparator means includes a Zener diode circuit connected at the output of said detector for producing a logic level output of said detector.

* * * * *